(12) United States Patent
Matsui et al.

(10) Patent No.: US 9,742,035 B2
(45) Date of Patent: *Aug. 22, 2017

(54) ELECTROCHEMICAL ENERGY STORAGE DEVICE

(71) Applicants: PANASONIC CORPORATION, Osaka (JP); Kyoto University, Kyoto (JP)

(72) Inventors: Toru Matsui, Osaka (JP); Akiyoshi Nakata, Osaka (JP); Toshiro Hirai, Tokyo (JP); Jun-ichi Yamaki, Kyoto (JP); Zempachi Ogumi, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 34 days.

This patent is subject to a terminal disclaimer.

(21) Appl. No.: 15/018,317

(22) Filed: Feb. 8, 2016

(65) Prior Publication Data

US 2016/0285128 A1    Sep. 29, 2016

(30) Foreign Application Priority Data

Mar. 26, 2015  (JP) ................................ 2015-064915

(51) Int. Cl.
*H01M 10/0568* (2010.01)
*H01M 10/0525* (2010.01)
(Continued)

(52) U.S. Cl.
CPC ....... *H01M 10/0568* (2013.01); *H01M 4/364* (2013.01); *H01M 4/381* (2013.01);
(Continued)

(58) Field of Classification Search
CPC ......... H01M 10/0567; H01M 10/0568; H01M 10/0525; H01M 2300/0025
See application file for complete search history.

(56) References Cited

U.S. PATENT DOCUMENTS

| | | |
|---|---|---|
| 2012/0082872 A1 | 4/2012 | Schmidt et al. |
| 2014/0170507 A1 | 6/2014 | Matsui et al. |

(Continued)

FOREIGN PATENT DOCUMENTS

| | | |
|---|---|---|
| JP | H10-106625 A | 4/1998 |
| JP | 2004-047416 A | 2/2004 |

(Continued)

OTHER PUBLICATIONS

Co-pending U.S. Appl. No. 15/018,304, filed Feb. 8, 2016.

*Primary Examiner* — Stewart Fraser
(74) *Attorney, Agent, or Firm* — McDermott Will & Emery LLP (57) ABSTRACT

An exemplary electrochemical energy storage device includes: a positive electrode including a positive electrode active material; a negative electrode including a negative electrode active material; and a non-aqueous electrolytic solution. The non-aqueous electrolytic solution includes an electrolyte salt represented by $Li(XSO_2NSO_2Y)$ (where X and Y are any of F, $C_nF_{2n+1}$ and $(CF_2)_m$, and $(CF_2)_m$ forms a cyclic imide anion), an organic solvent which is capable of dissolving the electrolyte salt, and a polyethylene glycol of which both terminals are not OH. The positive electrode active material includes a chloride of Cu, Bi or Ag, and the negative electrode active material includes lithium.

9 Claims, 9 Drawing Sheets (51) Int. Cl.
  *H01M 4/36* (2006.01)
  *H01M 4/38* (2006.01)
  *H01M 4/40* (2006.01)
  *H01M 4/58* (2010.01)
  *H01M 10/0569* (2010.01)
  *H01M 4/02* (2006.01)
  *H01M 10/0567* (2010.01)

(52) U.S. Cl.
  CPC ........... *H01M 4/382* (2013.01); *H01M 4/405* (2013.01); *H01M 4/582* (2013.01); *H01M 10/0525* (2013.01); *H01M 10/0569* (2013.01); *H01M 10/0567* (2013.01); *H01M 2004/027* (2013.01); *H01M 2004/028* (2013.01); *H01M 2300/0028* (2013.01)

(56) References Cited

U.S. PATENT DOCUMENTS

| | | | |
|---|---|---|---|
| 2015/0140422 A1* | 5/2015 | Liu | H01M 4/505 429/200 |
| 2016/0233547 A1* | 8/2016 | Matsui | H01M 10/0567 |
| 2016/0285128 A1 | 9/2016 | Matsui et al. | |

FOREIGN PATENT DOCUMENTS

| | | |
|---|---|---|
| JP | 2008-171574 A | 7/2008 |
| JP | 2013-542562 A | 11/2013 |
| WO | 2013/157187 A1 | 10/2013 |

* cited by examiner

ELECTROCHEMICAL ENERGY STORAGE DEVICE

RELATED APPLICATIONS

This application claims the benefit of priority of Japanese Application No. 2015-064915, filed on Mar. 26, 2015, the disclosure of which is incorporated by reference herein.

BACKGROUND

1. Field of the Invention

The present application relates to an electrochemical energy storage device.

2. Description of the Related Art

In recent years, research and development for increasing the energy density of non-aqueous electrolytic solution rechargeable batteries have been increasingly extensive. The non-aqueous electrolytic solution rechargeable batteries are used as a power supply for electronic devices, such as cell phones, portable information devices, laptop computers, video cameras, handheld game consoles, etc., a power supply for driving electric tools, cleaners, robots, etc., a power supply for driving or supporting an electric motor of hybrid electric cars, plug-in hybrid electric cars, fuel cell powered cars, etc.

To increase the energy density of the non-aqueous electrolytic solution rechargeable battery, it is necessary to use a material which has large electric capacity as an active material of an electrode. For example, when cupric chloride ($CuCl_2$) is used as the positive electrode active material and a lithium metal is used as the negative electrode active material, the electric capacity of 399 mAh/g can be obtained through reactions such as represented by formula (1) and formula (2). This value is equivalent to about three times the electric capacity of $Li_{0.5}CoO_2$ that is used as the positive electrode active material in lithium ion batteries of today. Note that the potentials shown at the heads of formula (1) and formula (2) are values calculated based on the standard free energies of formation of cupric chloride, cuprous chloride (CuCl), and lithium chloride (LiCl).

3.40 V: $CuCl_2 + Li^+ e \rightarrow CuCl + LiCl$      (1)

2.74 V: $CuCl + Li^+ + e \rightarrow Cu + LiCl$      (2)

Japanese Laid-Open Patent Publication No. 2004-47416 (hereinafter, referred to as "Patent Document 1") discloses a non-aqueous electrolytic solution rechargeable battery in which cupric chloride ($CuCl_2$) is used for the positive electrode active material, and suggests using a fluorinated solvent as the solvent of the non-aqueous electrolytic solution. Patent Document 1 discloses that, for example, when electric discharge (reduction) of cupric chloride is caused in a non-aqueous electrolytic solution in which lithium hexafluorophosphate ($LiPF_6$) at the concentration of 1 M and lithium chloride (LiCl) at the concentration of 2.4 mM ("100 mg/liter" in Patent Document 1) are dissolved as the electrolyte salts with the use of trifluoropropylene carbonate (abbreviated as TFPC), the reaction of formula (2) occurs subsequent to the reaction of formula (1). Here, the reasons for the use of TFPC are to suppress excessive dissolution of cupric chloride in the electrolytic solution and to prevent self-discharge.

SUMMARY

The prior art technique needs further improvement for better reaction reversibility, i.e., better reversibility in charging and discharging. A non-limiting exemplary embodiment of the present application provides an electrochemical energy storage device in which a metal chloride is used as the positive electrode active material and which has excellent reaction reversibility.

In one general aspect, an electrochemical energy storage device disclosed herein includes: a positive electrode including a positive electrode active material; a negative electrode including a negative electrode active material; and a non-aqueous electrolytic solution including an electrolyte salt represented by $Li(XSO_2NSO_2Y)$ (where X and Y are any of F, $C_nF_{2n+1}$ and $(CF_2)_m$, and $(CF_2)_m$ forms a cyclic imide anion), an organic solvent which is capable of dissolving the electrolyte salt, and a polyethylene glycol of which both terminals are not OH, the non-aqueous electrolytic solution being in contact with the positive electrode and the negative electrode, wherein the positive electrode active material includes a chloride of Cu, Bi or Ag, and the negative electrode active material includes lithium.

According to an electrochemical energy storage device disclosed in the present application, the non-aqueous electrolytic solution can suppress excessive dissolution of a metal chloride and can improve the reaction reversibility as the active material. Thus, an electrochemical energy storage device of high energy density is realized in which a metal chloride is used as the positive electrode active material.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

The inventor of the present application closely examined the non-aqueous electrolytic solution rechargeable battery disclosed in Patent Document 1. In formula (1) and formula (2) shown above, a leftward reaction, i.e., a charging reaction, is unlikely to advance. This is because lithium chloride that is a product of discharge is hardly soluble in an organic solvent.

Considering formula (1) as an example, when the battery is in an open circuit state (equilibrium state), cupric chloride ($CuCl_2$), cuprous chloride (CuCl) and lithium chloride (LiCl) undergo equilibrium reactions represented by formulae (3) to (5):

$$CuCl_2 \Leftrightarrow Cu^{2+} + 2Cl^- \quad (3)$$

$$CuCl \Leftrightarrow Cu^+ + Cl^- \quad (4)$$

$$LiCl \Leftrightarrow Li^+ + Cl^- \quad (5)$$

That is, each of the substances can dissociate and emit chlorine ions. In order to advance the reaction of formula (1) leftward, it is preferred that the equilibrium reactions in formula (4) and formula (5) are shifted rightward to produce chlorine ions such that the chlorine ions can be utilized for the charging reaction of formula (1). Specifically, it is preferred that the chlorine ions are dissolved in the electrolytic solution at a sufficient concentration. Such an electrolytic solution has chlorine ion conductivity. Meanwhile, such an electrolytic solution is considered to enhance dissolution of cupric chloride produced by charging as represented by formula (3) and causes self-discharge of the battery.

Thus, according to the conventional technology, in realizing a non-aqueous electrolytic solution rechargeable battery in which a metal chloride is used for the positive electrode active material, it is difficult to restore the original metal chloride by charging because lithium chloride that is a product of discharge is hardly soluble. On the other hand, in the case of an organic solvent which dissociates the lithium chloride, the solubility of a metal chloride in the organic solvent is high so that, disadvantageously, self-discharge is likely to advance.

In view of the above problem, the inventor of the present application conceived an electrochemical energy storage device which is excellent in reaction reversibility of a metal chloride as the electrode active material. The summary of an electrochemical energy storage device according to one embodiment of the present application is as follows.

[Item 1]

An electrochemical energy storage device, including: a positive electrode including a positive electrode active material; a negative electrode including a negative electrode active material; and a non-aqueous electrolytic solution including an electrolyte salt represented by $Li(XSO_2NSO_2Y)$ (where X and Y are any of F, $C_nF_{2n+1}$ and $(CF_2)_m$, and $(CF_2)_m$ forms a cyclic imide anion), an organic solvent which is capable of dissolving the electrolyte salt, and a polyethylene glycol of which both terminals are not OH, the non-aqueous electrolytic solution being in contact with the positive electrode and the negative electrode, wherein the positive electrode active material includes a chloride of Cu, Bi or Ag, and the negative electrode active material includes lithium. According to this configuration, the non-aqueous electrolytic solution includes a lithium imide, an organic solvent, and a polyethylene glycol derivative, and therefore, dissolves a metal chloride that is necessary in an electrode reaction and suppresses excessive dissolution of the metal chloride. Thus, an electrochemical energy storage device of high energy density is realized in which a metal chloride as the active material can efficiently undergo a reversible reaction, which has excellent cycle characteristics, of which self-discharge is suppressed, and in which the metal chloride is used as the positive electrode active material.

[Item 2]

The electrochemical energy storage device of Item 1, wherein the non-aqueous electrolytic solution is a single-phase solution when it is at a normal temperature, and the non-aqueous electrolytic solution includes the electrolyte salt in a proportion exceeding a solubility of the electrolyte salt in the organic solvent. According to this configuration, the non-aqueous electrolytic solution more surely dissolves a metal chloride that is necessary in an electrode reaction and suppresses excessive dissolution of the metal chloride.

[Item 3]

The electrochemical energy storage device of Item 2, wherein the organic solvent is tetrahydrofuran.

[Item 4]

The electrochemical energy storage device of Item 2, wherein the organic solvent is propylene carbonate.

[Item 5]

The electrochemical energy storage device of Item 1, wherein the positive electrode active material includes $CuCl_2$, CuCl, $BiCl_3$, or AgCl.

[Item 6]

The electrochemical energy storage device of Item 1, wherein the positive electrode includes LiCl when the electrochemical energy storage device is in a charged state.

[Item 7]

The electrochemical energy storage device of Item 1, wherein the negative electrode active material is a lithium metal.

[Item 8]

The electrochemical energy storage device of Item 1, wherein the negative electrode active material is a mixture of a magnesium metal and lithium chloride or an alloy of lithium and magnesium.

[Item 9]

The electrochemical energy storage device of Item 8, wherein the magnesium metal and the alloy of lithium and magnesium are produced by charging of a battery in which a magnesium compound is used in a negative electrode.

[Item 10]

The electrochemical energy storage device of Item 9, wherein the magnesium compound is magnesium chloride.

Hereinafter, an embodiment of an electrochemical energy storage device according to the present disclosure is described in detail. The electrochemical energy storage device is a generic term that includes rechargeable batteries, devices which are capable of repeatedly storing charge by charging and discharging, such as capacitors, hybrid capacitors, etc., and primary batteries.

An electrochemical energy storage device of the present embodiment includes: a positive electrode including a positive electrode active material; a negative electrode including a negative electrode active material; and a non-aqueous electrolytic solution which is in contact with the positive electrode and the negative electrode. The non-aqueous electrolytic solution includes an electrolyte salt represented by $Li(XSO_2NSO_2Y)$ (where X and Y are any of F, $C_nF_{2n+1}$ and $(CF_2)_m$, and $(CF_2)_m$ forms a cyclic imide anion), an organic solvent which is capable of dissolving the electrolyte salt, and a polyethylene glycol of which both terminals are not OH (hereinafter, referred to as "polyethylene glycol derivative"). The positive electrode active material includes a chloride of Cu, Bi or Ag, and the negative electrode active material includes lithium. Hereinafter, components of the present embodiment are described in detail.

1. Components of Electrochemical Energy Storage Device 1.1 Non-Aqueous Electrolytic Solution The non-aqueous electrolytic solution in an electrochemical energy storage device of the present embodiment includes a lithium imide, an organic solvent and a polyethylene glycol derivative. The lithium imide is dissolved as an electrolyte salt in a mixture of the organic solvent and the polyethylene glycol derivative.

The lithium imide used in the non-aqueous electrolytic solution of the present disclosure is represented by $Li(XSO_2NSO_2Y)$. Here, X and Y are any of F, $C_nF_{2n+1}$ and $(CF_2)_m$. n and m are integers not less than 1. $Li(XSO_2NSO_2Y)$ is a salt where $Li^+$ is the cation and $(XSO_2NSO_2Y)^-$ is the anion. X and Y may be the same elements or may be different elements. When X is $(CF_2)_m$, it is preferred that Y is also $(CF_2)_m$. In this case, $(XSO_2NSO_2Y)^-$ forms a heterocyclic imide anion including N and S.

Examples of a lithium imide which includes a chain imide anion include $Li(FSO_2)_2N$, $Li(FSO_2)(CF_3SO_2)N$, $Li(CF_3SO_2)_2N$, $Li(C_2F_5SO_2)_2N$, and $Li(CF_3SO_2)(C_4F_9SO_2)N$. Examples of a salt which includes a cyclic imide anion include $Li(CF_2SO_2)_2N$ (which forms a five-membered ring) and $LiCF_2(CF_2SO_2)_2N$ (which forms a six-membered ring). Using $Li(CF_3SO_2)_2N$ (lithium bis trifluoromethane sulfonimide; hereinafter, abbreviated as LiTFSI) is the most preferred.

The lithium imide is soluble in the organic solvent at a high concentration, and the resultant solution would not change in color and is stable for a long period of time. For example, in the case where the lithium imide is lithium bis(trifluoromethane sulfonyl)imide ($Li(CF_3SO_2NSO_2CF_3)$; abbreviated as LiTFSI) and the organic solvent which dissolves LiTFSI is tetrahydrofuran (abbreviated as THF), a transparent non-aqueous electrolytic solution can be obtained when the composition is LiTFSI/THF=4/6 (molar ratio). In such a solution, THF is entirely solvated with lithium ions, so that a solvent which is necessary for dissolving a metal chloride such as cupric chloride ($CuCl_2$) is lacking. For information, in lithium ion batteries of today, a non-aqueous electrolytic solution at the concentration of lithium salt/organic solvent=about 4/44 (molar ratio) is used. Such a non-aqueous electrolytic solution in which the electrolyte salt is dissolved at a high concentration exhibits characteristics of a molten salt consisting of a cation and an anion and enhances dissociation of lithium chloride (LiCl) that is an ionic substance. Therefore, the dissociation equilibrium of formula (5) shown above shifts rightward. Also, likewise, the dissociation equilibrium of cuprous chloride (CuCl) that has low solubility, which is represented by formula (4), shifts rightward. Thus, the leftward reaction in formula (1), i.e., a charging reaction, readily advances.

A non-aqueous electrolytic solution of high salt concentration has high viscosity. Such a characteristic also suppresses excessive dissolution of cupric chloride ($CuCl_2$) in a charged state and leads to desirable maintenance of the dissociation equilibrium at an active material surface which is represented by formula (3).

The organic solvent included in the non-aqueous electrolytic solution is a cyclic carbonate solvent, a chain carbonate solvent, a cyclic ether solvent, or a chain ether solvent.

Examples of the cyclic carbonate solvent include propylene carbonate, ethylene carbonate, butylene carbonate, vinylene carbonate, vinyl ethylene carbonate, and fluoroethylene carbonate.

Examples of the chain carbonate solvent include dimethyl carbonate, ethyl methyl carbonate, diethyl carbonate, methyl propyl carbonate, methyl butyl carbonate, and methyl pentyl carbonate.

Examples of a cyclic ester solvent include γ-butyrolactone, α-methyl-γ-butyrolactone, γ-valerolactone, furanone, 3-methyl-2(5H)-furanone, and α-angelicalactone.

Examples of a chain ester solvent include methyl acetate, methyl propionate, methyl butyrate, methyl valerate, methyl caproate, and methyl enanthate.

Examples of the cyclic ether solvent include tetrahydrofuran, 2-methyltetrahydrofuran, 2,5-dimethyl tetrahydrofuran, 1,3-dioxolane, 2-methyl-1,3-dioxolane, tetrahydropyran, and 2-methyl-tetrahydropyran.

Examples of the chain ether solvent include diethyl ether, methyl butyl ether, 1-methoxy-2-ethoxyethane, and 1,2-diethoxyethane.

Alternatively, the organic solvent included in the non-aqueous electrolytic solution may be a nitrile solvent or an organic solvent which includes a nitrogen or sulfur element.

Examples of the nitrile solvent include acetonitrile, propionitrile, and adiponitrile.

Examples of the organic solvent which includes a nitrogen or sulfur element include N-methyl pyrrolidone, dimethyl sulfoxide, and sulfolane.

These organic solvents may be solely used. Alternatively, some of these organic solvents may be used in mixture. The solvents may be solid at a normal temperature so long as they are liquid when prepared as an electrolytic solution. Here, the normal temperature is defined as a temperature in the range of 5° C. to 35° C.

The polyethylene glycol derivative is a compound which is represented by $R_1-(OCH_2CH_2)_p-OR_2$ (where $R_1$ and $R_2$ are not H). p is an integer not less than 1. This polyethylene glycol derivative reduces the viscosity of the electrolytic solution which is necessary for the rechargeable battery while maintaining the dissociation equilibrium of formulae (3) to (5).

In the polyethylene glycol of which both terminals are not OH, when the terminals are methyl groups, the molecular weight of the polyethylene glycol is generally in the range of 200 to 2000. Such a polyethylene glycol derivative exhibits excellent compatibility with a solution in which a lithium imide is dissolved at a high concentration and can adjust the viscosity of the electrolytic solution. The terminals of the polyethylene glycol derivative, i.e., $R_1$ and $R_2$, may be, independently, chain saturated hydrocarbon groups, chain unsaturated hydrocarbon groups, cyclic saturated hydrocarbon groups, or cyclic unsaturated hydrocarbon groups, such as methyl groups, ethyl groups, propyl groups, and phenyl groups. Some or all of "H"s included in these functional groups may be replaced by "F"s.

It is preferred that the non-aqueous electrolytic solution is a single-phase solution when it is at a normal temperature and includes the lithium imide in a proportion exceeding the solubility of the lithium imide in the organic solvent. A non-aqueous electrolytic solution having such characteristics can be prepared by, for example, mixing together the lithium imide and the organic solvent in such proportion that the lithium imide precipitates or does not entirely dissolve at a normal temperature and gradually adding the polyethylene glycol derivative to the mixture till the resultant solution becomes a single-phase solution.

When the amount of the added polyethylene glycol derivative in the non-aqueous electrolytic solution is excessively small, discharge (reduction) of the metal chloride cannot be sufficiently accomplished. On the other hand, when the amount of the added polyethylene glycol derivative in the non-aqueous electrolytic solution is excessively large, the metal chloride is excessively dissolved in the non-aqueous electrolytic solution so that self-discharge can readily advance.

It is preferred that the content of the lithium imide in the non-aqueous electrolytic solution is greater than an amount which can be entirely dissolved in the organic solvent in the non-aqueous electrolytic solution and is not more than about 1.2 times the amount which can be entirely dissolved. It is also preferred that the non-aqueous electrolytic solution includes the polyethylene glycol derivative in a proportion of more than 0 wt % and not more than 20 wt %. For example, when the lithium imide is LiTFSI, the organic solvent is THF, and the polyethylene glycol derivative is polyethylene glycol dimethyl ether, it is preferred that the non-aqueous electrolytic solution includes a larger amount of LiTFSI than in the case where the ratio between LiTFSI and THF in the non-aqueous electrolytic solution is 4:6, and includes LiTFSI such that the ratio between LiTFSI and THF is 4.8:6 or a smaller ratio. Also, it is preferred that the non-aqueous electrolytic solution includes the polyethylene glycol dimethyl ether (abbreviated as PEGDME) in a proportion of not less than 8 wt % and not more than 20 wt %.

So long as the above-described salt is included as a major constituent of the electrolyte, the non-aqueous electrolytic solution may include any other salt or solvent as an assisting agent or additive. However, it is preferred that the non-aqueous electrolytic solution does not include a chloride as the electrolyte salt.

The non-aqueous electrolytic solution in the electrochemical energy storage device of the present disclosure includes the above-described lithium imide, organic solvent and polyethylene glycol derivative and is therefore capable of dissolving a metal chloride which is necessary for an electrode reaction and suppressing excessive dissolution of the metal chloride. The non-aqueous electrolytic solution does not include chlorine ions as the electrolyte salt. Therefore, when the battery is in an open-circuit state (equilibrium state of the electrode reaction), chlorine ions produced by dissociation of the metal chloride are present near the electrode. In the non-aqueous electrolytic solution, a larger amount of lithium ions and imide anions are present than chlorine ions. Therefore, the non-aqueous electrolytic solution does not have substantial chlorine ion conductivity. Thus, lithium ions work as carriers that carry charges between the positive electrode and the negative electrode.

1.2 Positive Electrode

The positive electrode of the electrochemical energy storage device of the present disclosure includes a metal chloride as the positive electrode active material. Specifically, the positive electrode includes a chloride of Cu, Bi or Ag. More specifically, the positive electrode active material is any of copper chloride (CuCl or $CuCl_2$), bismuth chloride ($BiCl_3$), or silver chloride (AgCl) when the electrochemical energy storage device is in a charged state. In the electrochemical energy storage device, these metal chlorides change according to the equilibrium reactions represented by formulae (3) to (5) shown above. Therefore, in a charged state, the positive electrode active material is in the form of microparticles so that it is sometimes difficult to detect as the original metal chloride. Particularly, in copper chloride and bismuth chloride, it is difficult to specify the crystalline form in a charged state.

The metal chloride that is the positive electrode active material is reduced in the process of discharging the battery to definitely produce any metal of Cu, Bi and Ag. Chemical reactions which occur at the positive electrode and the negative electrode in the charging and discharging processes are specifically described below.

The positive electrode may be formed by a cathodic composite including the above-described positive electrode active material and a collector. For example, when a metal chloride is used in the positive electrode active material, the cathodic composite can be formed by mixing together the above-described metal chloride, an electrically-conductive assisting agent such as acetylene black, and a binder such as polyvinylidene fluoride. These powders may be molded after the powders themselves have been mixed together or may be dispersed or dissolved in a solvent such as N-methyl-2-pyrrolidone (NMP) and applied over the collector. For the collector, carbon, molybdenum, tungsten, gold, platinum, or the like, can be used.

1.3 Negative Electrode

The negative electrode of the electrochemical energy storage device of the present disclosure includes lithium as the negative electrode active material. In a charging process, the negative electrode takes in lithium ions from the non-aqueous electrolytic solution. In a discharging process, the negative electrode releases lithium ions to the non-aqueous electrolytic solution. Specifically, the lithium metal is an intercalation compound of lithium and graphite such as employed in lithium ion batteries, an alloy or oxide which includes lithium, or the like. The alloy includes, for example, magnesium, calcium, zinc, silicon, tin, lead, or bismuth as a constituent. Specifically, the alloy may be a mixture of a magnesium metal and lithium chloride, an alloy of lithium and magnesium, or the like. The oxide includes, for example, titanium, cobalt, nickel, silicon, or tin as a constituent.

Alternatively, it may be a substance from which lithium hydride, lithium fluoride or lithium chloride is produced in a charging process. In the case of magnesium chloride ($MgCl_2$), the following reactions occur in a charging process:

$$MgCl_2 + 2Li^+ + 2e^- \rightarrow Mg + 2LiCl \quad (6)$$

$$Mg + xLi^+ + xe^- \rightarrow MgLi_x \quad (7)$$

Formula (6) represents reductive decomposition of magnesium chloride to a magnesium metal. Formula (7) represents an alloying reaction of the produced magnesium metal and lithium ions in the electrolytic solution.

In the case where a hybrid capacitor is manufactured as the electrochemical energy storage device, a carbon material which is capable of storing electric double layer capacity can also be used for the negative electrode material. The carbon material includes activated carbons. The activated carbons include natural plant activated carbons such as coconut shells, synthetic resin activated carbons such as phenols, and fossil fuel activated carbons such as cokes. Also, an ultrafine powder activated carbon obtained by activating carbon black may be used.

The negative electrode may be formed by an anodic composite including the above-described negative electrode active material and a collector. Powder of the negative electrode active material may be molded without any modification or may be dispersed or dissolved in a solvent such as acetonitrile and applied over the collector. For the collector, carbon, iron, nickel, copper, or the like, can be used.

1.4 Separator

The electrochemical energy storage device of the present embodiment is capable of charging and discharging so long as the positive electrode and the negative electrode are electrically separated from each other and the non-aqueous electrolytic solution is kept in contact with the positive electrode and the negative electrode. For practical reasons, in order to realize an electrochemical energy storage device in a stable form, the electrochemical energy storage device may further include a separator, such as those commonly used in rechargeable batteries. The separator is a resin layer which is made of a resin which does not have electron conductivity, and is a microporous film which has high ion permeability and which has predetermined mechanical strength and electrical insulation. The separator is preferably made of a material which is resistant to the above-described non-aqueous electrolytic solution. For example, a polyolefin resin can be used which is made of any, or a combination, of polypropylene, polyethylene, etc., such as those commonly used in lithium rechargeable batteries.

1.5 Configuration of Entire Electrochemical Energy Storage Device

Figure 9:
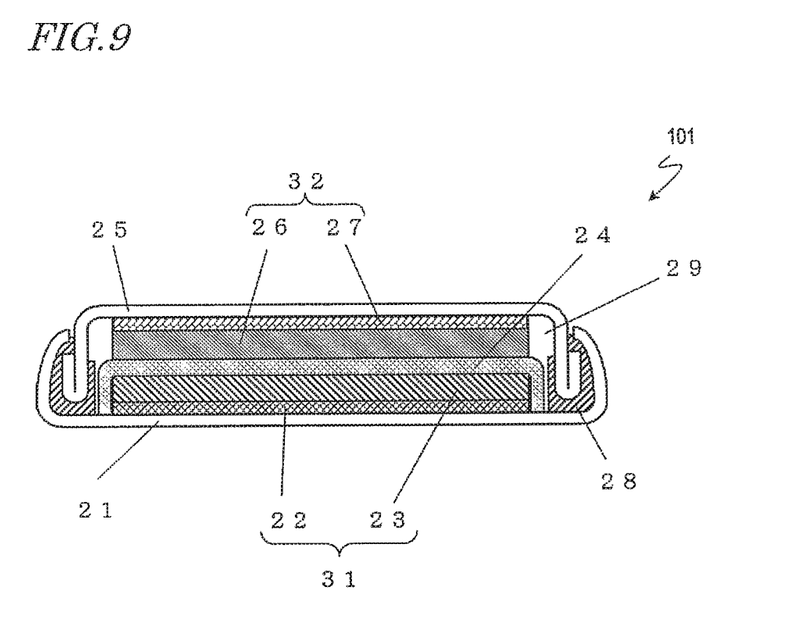
FIG. 9 is a cross-sectional view showing an embodiment of a coin-shaped non-aqueous electrolytic solution rechargeable battery.

An example which constitutes a rechargeable battery as the electrochemical energy storage device is described. FIG. 9 is a cross-sectional view showing an example of a coin-shaped rechargeable battery 101 that is one of the electrochemical energy storage device. The coin-shaped rechargeable battery 101 shown in FIG. 9 includes a positive electrode 31, a negative electrode 32, and a separator 24. The positive electrode 31 includes a positive electrode active material layer 23 and a positive electrode collector 22 which is in contact with the positive electrode active material layer 23. The negative electrode 32 includes a negative electrode active material layer 26 and a negative electrode collector 27 which is in contact with the negative electrode active material layer 26. At least one of the positive electrode active material layer 23 and the negative electrode active material layer 26 includes the above-described metal chloride.

The positive electrode 31 and the negative electrode 32 constitute an electrode group in which the positive electrode active material layer 23 and the negative electrode active material layer 26 oppose each other via the separator 24 so as to be in contact with the separator 24.

The electrode group is housed in a space inside a case 21. The space inside the case 21 is filled with the above-described non-aqueous electrolytic solution 29. The positive electrode 31, the negative electrode 32, and the separator 24 are impregnated with the non-aqueous electrolytic solution 29. The separator 24 has minute spaces for retaining the non-aqueous electrolytic solution 29. Therefore, the non-aqueous electrolytic solution 29 is retained in the minute spaces, so that the non-aqueous electrolytic solution 29 is present between the positive electrode 31 and the negative electrode 32. The opening of the case 21 is closed by a closure plate 25 using a gasket 28.

Although an embodiment of the coin-shaped rechargeable battery is shown in FIG. 9, the electrochemical energy storage device of the present embodiment may have any other shape. For example, the electrochemical energy storage device may have a cylindrical or polygonal shape. Alternatively, the electrochemical energy storage device may have a large size for use in electric cars or the like.

2. Electrode Reaction in Electrochemical Energy Storage Device

Next, a major electrode reaction in an electrochemical energy storage device in which $BiCl_3$ is used as the positive electrode active material is described.

(A) Discharging reaction of $BiCl_3//Li$ battery $$\text{POSITIVE ELECTRODE: } BiCl_3 + 3Li^+ + 3e \rightarrow Bi + 3LiCl \quad (8)$$

$$\text{NEGATIVE ELECTRODE: } 3Li \rightarrow 3Li^+ + 3e \quad (9)$$

$$\text{TOTAL: } BiCl_3 + 3Li \rightarrow Bi + 3LiCl \quad (10)$$

Although formula (10) is in such a form that chlorine transfers from the positive electrode active material to the negative electrode active material, produced LiCl is present in the positive electrode. That is, lithium ions transfer from the negative electrode to the positive electrode, and the positive electrode includes LiCl in a discharged state.

(B) Charging Reaction of LiCl-Containing $Bi//C_6$ (Graphite) Battery $$\text{POSITIVE ELECTRODE: } Bi + 3LiCl \rightarrow BiCl_3 + 3Li^+ + 3e \quad (11)$$

$$\text{NEGATIVE ELECTRODE: } 3C_6 + 3Li^+ + 3e \rightarrow 3C_6Li \quad (12)$$

$$\text{TOTAL: } Bi + 3LiCl + 3C_6 \rightarrow BiCl_3 + 3C_6Li \quad (13)$$

In formula (13), lithium ions transfer from the positive electrode to the negative electrode.

(C) Charging Reaction of LiCl-Containing $Bi//NiO$ Battery $$\text{POSITIVE ELECTRODE: } 2Bi + 6LiCl \rightarrow 2BiCl_3 + 6Li^+ + 6e \quad (14)$$

$$\text{NEGATIVE ELECTRODE: } 3NiO + 6Li^+ + 6e \rightarrow 3Ni + 3Li_2O \quad (15)$$

$$\text{TOTAL: } 2Bi + 6LiCl + 3NiO \rightarrow 2BiCl_3 + 3Ni + 3Li_2O \quad (16)$$

In formula (16), lithium ions transfer from the positive electrode to the negative electrode.

(D) Charging Reaction of LiCl-Containing $Bi//MgCl_2$ Battery $$\text{POSITIVE ELECTRODE: } Bi + 3LiCl \rightarrow BiCl_3 + 3Li^+ + 3e \quad (17)$$

$$\text{NEGATIVE ELECTRODE: } MgCl_2 + 2Li^+ + 2e \rightarrow Mg + 2LiCl \quad (18)$$

$$Mg + xLi^+ + xe \rightarrow MgLi_x \quad (19)$$

$$\text{TOTAL: } Bi + 3LiCl + sMgCl_2 + tMg \rightarrow BiCl_3 + uMg + 2vLiCl + wMgLi_x \quad (20)$$

where s, t, u, v, w, and x are values determined depending on the ratio between $BiCl_3$ and $MgCl_2$ and the reaction rate of $MgCl_2$.

Thus, according to the electrochemical energy storage device of the present disclosure, the non-aqueous electrolytic solution includes the above-described lithium imide, organic solvent, and polyethylene glycol derivative and therefore dissolves a metal chloride that is necessary in an electrode reaction and suppresses excessive dissolution of the metal chloride. Thus, an electrochemical energy storage device of high energy density is realized in which a metal chloride as the active material can efficiently undergo a reversible reaction, which is excellent in reversibility of charging and discharging, i.e., cycle characteristics, of which self-discharge is suppressed, and in which the metal chloride is used as the positive electrode active material.

Although in the present embodiment the electrochemical energy storage device has been described with an example of a rechargeable battery, the electrochemical energy storage device may be a primary battery. Conventionally, in primary batteries in which a metal halide, particularly a highly-soluble metal chloride, is used, the electrode active material and the electrolytic solution are brought into contact with each other immediately before use as seen in liquid-injected batteries. According to the present embodiment, a metal halide as the electrode active material and the electrolytic solution are brought into contact with each other. Even in a state where a primary battery is completed, the metal halide is unlikely to be dissolved in the electrolytic solution, and therefore, deterioration of the characteristics of the primary battery is suppressed.

EXAMPLES

The present invention is specifically described below with actual examples. Note that all experiments were carried out at room temperature in a glove box filled with an argon atmosphere.

Example 1

We assembled a battery in which bismuth chloride ($BiCl_3$) was used as the positive electrode active material and lithium metal was used as the negative electrode active material, and verified that there is an electrolytic solution composition which is capable of three-electron reduction of bismuth chloride.

Bismuth chloride (manufactured by Aldrich), acetylene black (manufactured by Denka Company Limited; abbreviated as AB), and polytetrafluoroethylene powder (manufactured by DAIKIN INDUSTRIES, LTD.; abbreviated as PTFE) were kneaded together such that the weight ratio was $BiCl_3$/AB/PTFE=50/40/10, and molded into a sheet. A disk with a diameter of 14.8 mm was punched out from this sheet and joined by compression with a platinum net of 100 meshes which has the same diameter (manufactured by The Nilaco Corporation), whereby a positive electrode was formed.

The negative electrode used was lithium foil with a diameter of 15.8 mm (manufactured by Honjo Metal Co., Ltd.).

The non-aqueous electrolytic solutions were prepared by mixing together LiTFSI (lithium bis(trifluoromethane sulfonyl)imide) and THF (manufactured by Wako Pure Chemical Industries, Ltd.) in a molar ratio of LiTFSI/THF=4/5 and adding PEGDME (polyethylene glycol dimethyl ether; manufactured by Aldrich) whose molecular weight was about 500 in various proportions. Each of the prepared electrolytic solutions was a single-phase, transparent liquid.

The thus-prepared positive electrode, negative electrode, and non-aqueous electrolytic solution were assembled, together with a polyolefin separator, in a mock battery case (manufactured by EC Frontier Co, Ltd.). The resultant mock battery was discharged at the rate of 300-hour rate relative to the positive electrode capacity.

Figure 1:
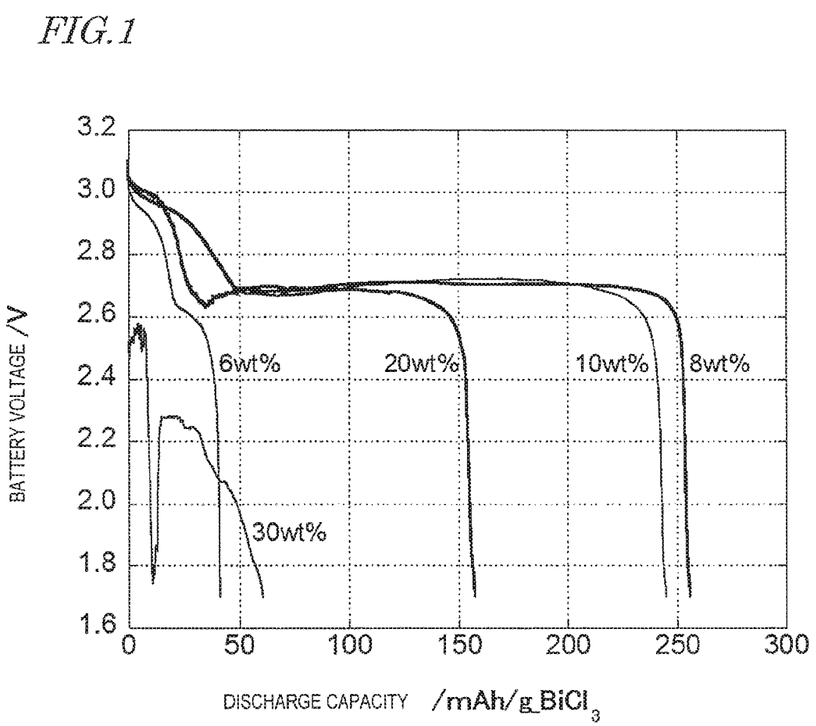
FIG. 1 shows a voltage variation which occurred when a non-aqueous electrolytic solution rechargeable battery in which bismuth chloride was used as the positive electrode active material was discharged, with the use of electrolytic solutions including polyethylene glycol dimethyl ether in different proportions.

FIG. 1 is a plot of discharge curves obtained in that case, where the weight percent represents the content of PEGDME included in the non-aqueous electrolytic solution. It can be seen from FIG. 1 that there is an appropriate value of the PEGDME content for causing three-electron reduction of bismuth chloride (corresponding to 255 mAh/g), and the range of such an appropriate value is 8 to 10 wt %.

The discharged batteries were disassembled and examined. In the battery in which the amount of added PEGDME was 6 wt %, the positive electrode surface appeared dried out. In the battery in which the amount of added PEGDME was 20 wt %, bismuth chloride was excessively dissolved in the non-aqueous electrolytic solution, and bismuth was detected in the lithium negative electrode.

Example 2

Among the non-aqueous electrolytic solution batteries assembled in Example 1, the battery in which the content of PEGDME was 8 wt % was assembled in the same way, and was subjected to charging and discharging. The conditions for charging and discharging were a constant current at the rate of 100-hour rate relative to the positive electrode capacity, the charge upper limit of 3.6 V, and the discharge lower limit voltage of 1.7 V.

Figure 2:
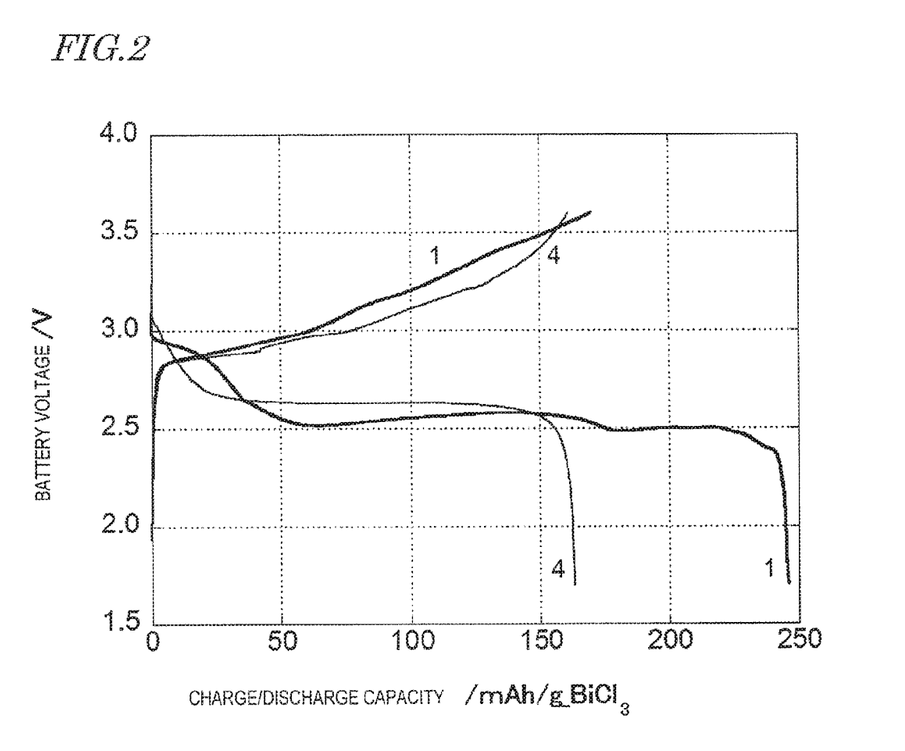
FIG. 2 shows charge and discharge curves of the first and fourth cycles in a non-aqueous electrolytic solution rechargeable battery in which bismuth chloride was used as the positive electrode active material.

FIG. 2 is a plot of charge and discharge curves of the first and fourth cycles obtained in that case. It can be seen from FIG. 2 that desirable charging and discharging can be accomplished.

Example 3

The present inventors verified that mixing lithium chloride (LiCl) into the positive electrode is effective in suppressing excessive dissolution of bismuth chloride ($BiCl_3$) in the non-aqueous electrolytic solution.

Lithium chloride (manufactured by Aldrich) and bismuth chloride were mixed together such that the molar ratio was LiCl/$BiCl_3$=1/1, and a positive electrode was formed in the same way as Example 1. For the sake of comparison, a positive electrode was formed where LiTFSI (manufactured by KISHIDA CHEMICAL Co., Ltd.) and bismuth chloride were mixed together such that the molar ratio was LiTFSI/$BiCl_3$=1/1.

The non-aqueous electrolytic solution used was prepared in the same way as Example 1 such that the content of PEGDME was 20 wt %.

A mock battery was assembled in the same way as Example 1 and discharged at the rate of 300-hour rate relative to the content of bismuth chloride.

Figure 3:
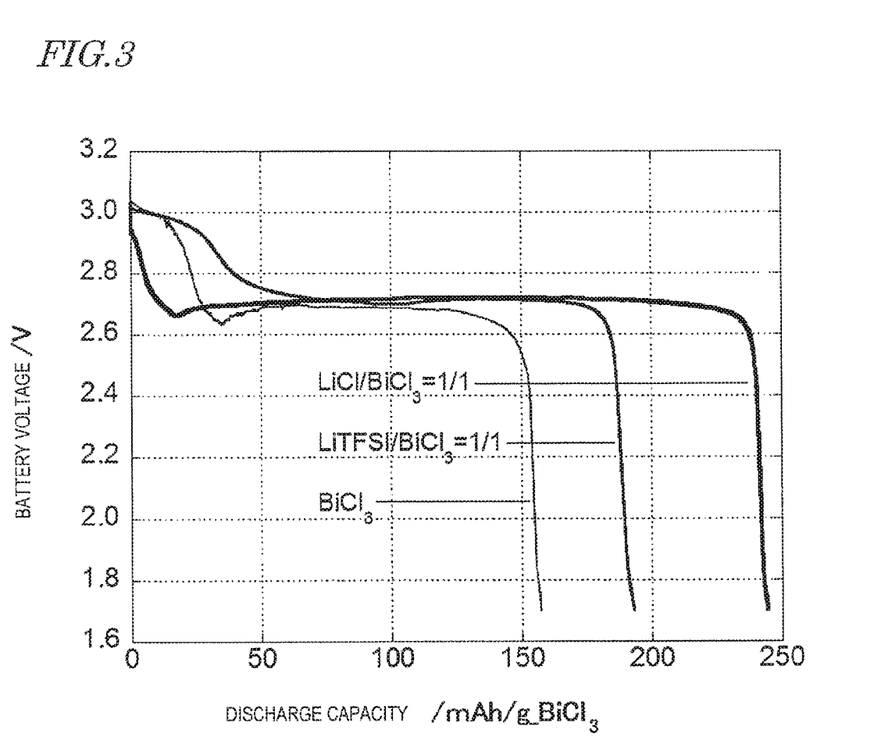
FIG. 3 shows discharge curves of a rechargeable battery in which the positive electrode included bismuth chloride and lithium chloride added thereto and the non-aqueous electrolytic solution used included tetrahydrofuran.

FIG. 3 is a plot of discharge curves obtained in that case. It can be seen from FIG. 3 that, in a battery in which lithium chloride was added in the positive electrode, three-electron reduction of bismuth chloride occurred. A battery in which LiTFSI was added in the positive electrode was disassembled after being discharged for examination, and the lithium negative electrode was found contaminated with bismuth.

The effect is achieved by the addition of lithium chloride probably because the equilibrium reaction shown below is shifted leftward, and excessive dissolution of bismuth chloride is suppressed. Since an unidentifiable X-ray diffraction peak also occurs in the positive electrode that is in contact with the electrolytic solution, it is estimated that a compound produced from lithium chloride and bismuth chloride covers the surface of bismuth chloride.

$$BiCl_3 \Leftrightarrow Bi^{3+} + 3Cl^- \qquad (21)$$

Example 4

The present inventors verified that, even when the organic solvent that dissolves the lithium imide is propylene carbonate, excessive dissolution of bismuth chloride can be suppressed by adding lithium chloride (LiCl) to bismuth chloride ($BiCl_3$).

The non-aqueous electrolytic solution was prepared as follows. LiTFSI and propylene carbonate (abbreviated as PC) were mixed together such that the molar ratio was LiTFSI/PC=4/5. PEGDME was added in a proportion of 10.2 wt % relative to the total amount, whereby a single-phase, transparent solution was obtained.

The positive electrode was formed in the same way as Example 1 with lithium chloride and bismuth chloride being mixed together in various ratios.

A mock battery was assembled in the same way as Example 1 and discharged at the rate of 300-hour rate relative to the content of bismuth chloride.

Figure 4:
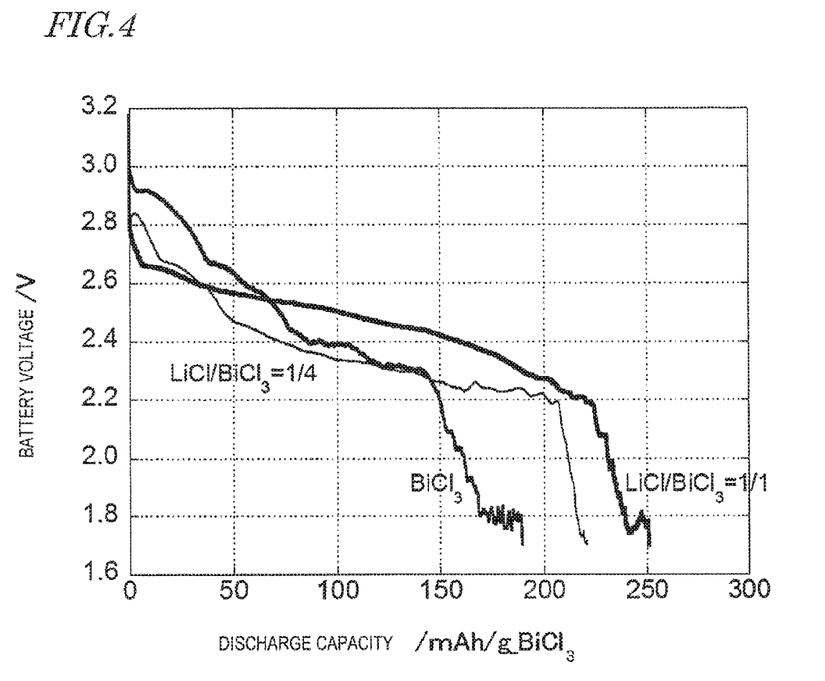
FIG. 4 shows discharge curves of a rechargeable battery in which the positive electrode included bismuth chloride and lithium chloride added thereto and the non-aqueous electrolytic solution used included propylene carbonate.

FIG. 4 is a plot of discharge curves obtained in that case. It can be seen from FIG. 4 that the discharge capacity increases as the content of lithium chloride in the positive electrode increases, and when the molar ratio is $LiCl/BiCl_3=1/1$, three-electron reduction of bismuth chloride is possible.

Example 5

The present inventors verified that, even when cupric chloride ($CuCl_2$) is used for the positive electrode active material, the non-aqueous electrolytic solution has an optimum mixture ratio between the organic solvent and the polyethylene glycol of which both terminals are not OH.

Cupric chloride (manufactured by Aldrich), acetylene black (abbreviated as AB), and polytetrafluoroethylene powder (abbreviated as PTFE) are kneaded together such that the weight ratio was $CuCl_2$/AB/PTFE=50/40/10, and molded into a sheet. A disk with a diameter of 14.8 mm was punched out from this sheet and joined by compression with a platinum net of 100 meshes which has the same diameter (manufactured by The Nilaco Corporation), whereby a positive electrode was formed.

The negative electrode used was lithium foil with a diameter of 15.8 mm (manufactured by Honjo Metal Co., Ltd.).

The non-aqueous electrolytic solutions were prepared by mixing together LiTFSI and PC in a molar ratio of LiTFSI/PC=4/5 and adding PEGDME whose molecular weight was about 500 in various proportions. Each of the prepared electrolytic solutions was a single-phase, transparent liquid.

The thus-prepared positive electrode, negative electrode, and non-aqueous electrolytic solution were assembled, together with a polyolefin separator, in a mock battery case. The resultant mock battery was discharged at the rate of 300-hour rate relative to the positive electrode capacity.

Figure 5:
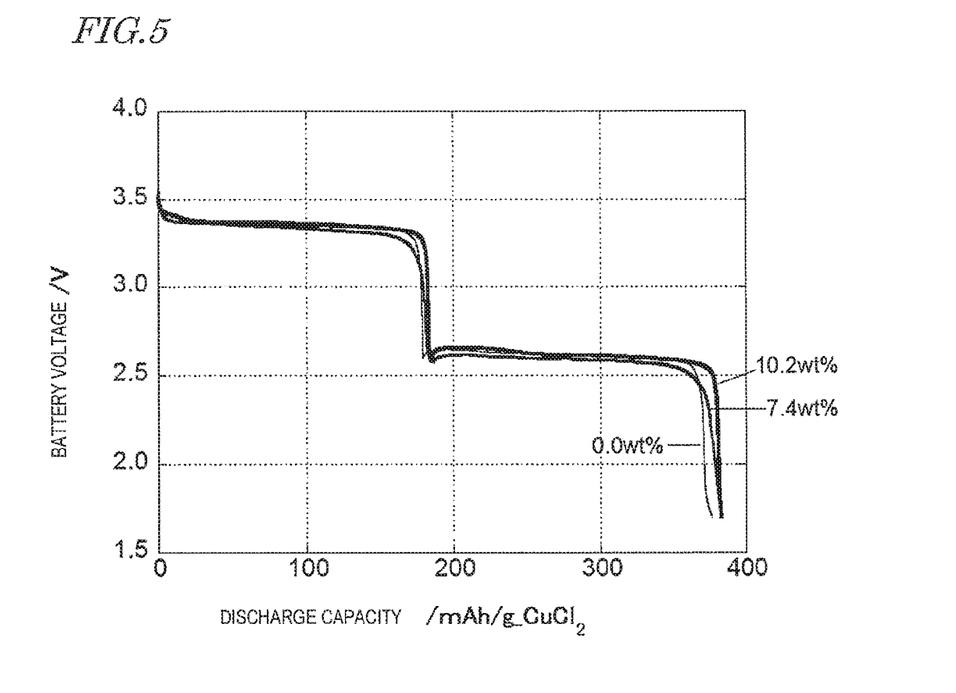
FIG. 5 shows a voltage variation which occurred when a non-aqueous electrolytic solution rechargeable battery in which cupric chloride was used as the positive electrode active material was discharged, with the use of electrolytic solutions including polyethylene glycol dimethyl ether in different proportions.

FIG. 5 is a plot of discharge curves obtained in that case, where the weight percent represents the content of PEGDME included in the non-aqueous electrolytic solution. It can be seen from FIG. 5 that, in order to cause two-electron reduction of cupric chloride (corresponding to 399 mAh/g) and decrease the overvoltage, the optimum content of PEGDME is 10.2 wt %. If the content of PEGDME is 7.4 wt %, the overvoltage is large although two-electron reduction occurs. If PEGDME is not included, dissolution and loss of cupric chloride in electrolytic solution occur, so that the discharge capacity for the two-electron reduction cannot be obtained.

Example 6

Among the non-aqueous electrolytic solution batteries assembled in Example 5, the battery in which the content of PEGDME was 10.2 wt % was assembled in the same way, and was subjected to charging and discharging. The discharge rate was 100-hour rate relative to the positive electrode capacity. The discharge lower limit voltage was 1.7 V. The charge rate was 300-hour rate. The charge upper limit voltage was 3.6 V.

Figure 6:
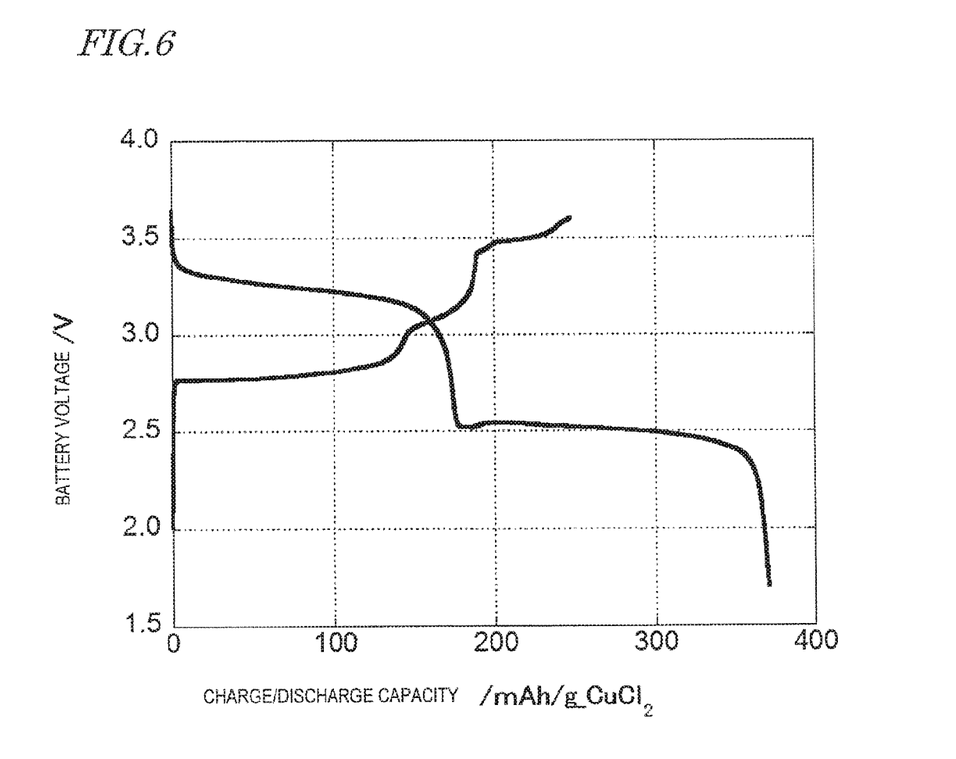
FIG. 6 shows charge and discharge curves of the first cycle in a non-aqueous electrolytic solution rechargeable battery in which cupric chloride was used as the positive electrode active material.

FIG. 6 is a plot of charge and discharge curves obtained in that case. It can be seen that desirable charging and discharging can be accomplished.

Example 7

The present inventors charged a positive electrode in which nanopowder of copper (Cu) and lithium chloride were mixed together, and verified that production of cuprous chloride (CuCl) and cupric chloride ($CuCl_2$) is possible. The present inventors also verified that magnesium chloride ($MgCl_2$) can be used in the negative electrode.

Nanopowder of copper (manufactured by Aldrich; 40 to 60 nm in diameter) and lithium chloride were mixed together such that the molar ratio was Cu/LiCl=1/2. This mixture, acetylene black (abbreviated as AB), and polytetrafluoroethylene powder (abbreviated as PTFE) were kneaded together such that the weight ratio was mixture/AB/PTFE=50/40/10, and molded into a sheet. A disk with a diameter of 14.8 mm was punched out from this sheet and joined by compression with a platinum net of 100 meshes, whereby a positive electrode was formed.

In the first battery, the negative electrode used was lithium foil with a diameter of 15.8 mm (manufactured by Honjo Metal Co., Ltd.).

In the second battery, the negative electrode was formed as follows with the use of magnesium chloride. Magnesium chloride (manufactured by Aldrich) was ground and mixed with acetylene black (abbreviated as AB) and polybutadiene (manufactured by Aldrich; abbreviated as PB) such that the weight ratio was $MgCl_2$/AB/PB=85/10/5, and molded into a sheet. A disk with a diameter of 15.8 mm was punched out from this sheet and joined by compression with a stainless 304 net of 100 meshes, whereby a negative electrode was formed.

The non-aqueous electrolytic solution was prepared by mixing together lithium bis(trifluoromethane sulfonyl)imide (abbreviated as LiTFSI) and tetrahydrofuran (abbreviated as THF) in a molar ratio of LiTFSI/THF=4/5 and adding PEGDME whose molecular weight was about 1000 in a proportion of 8 wt %.

The thus-prepared positive electrode, negative electrode, and non-aqueous electrolytic solution were assembled, together with a polyolefin separator, in a mock battery case. The resultant mock battery was charged at the rate of 300-hour rate relative to the positive electrode capacity. The second battery in which $MgCl_2$ was used in the negative electrode was also subjected to discharging.

Figure 7:
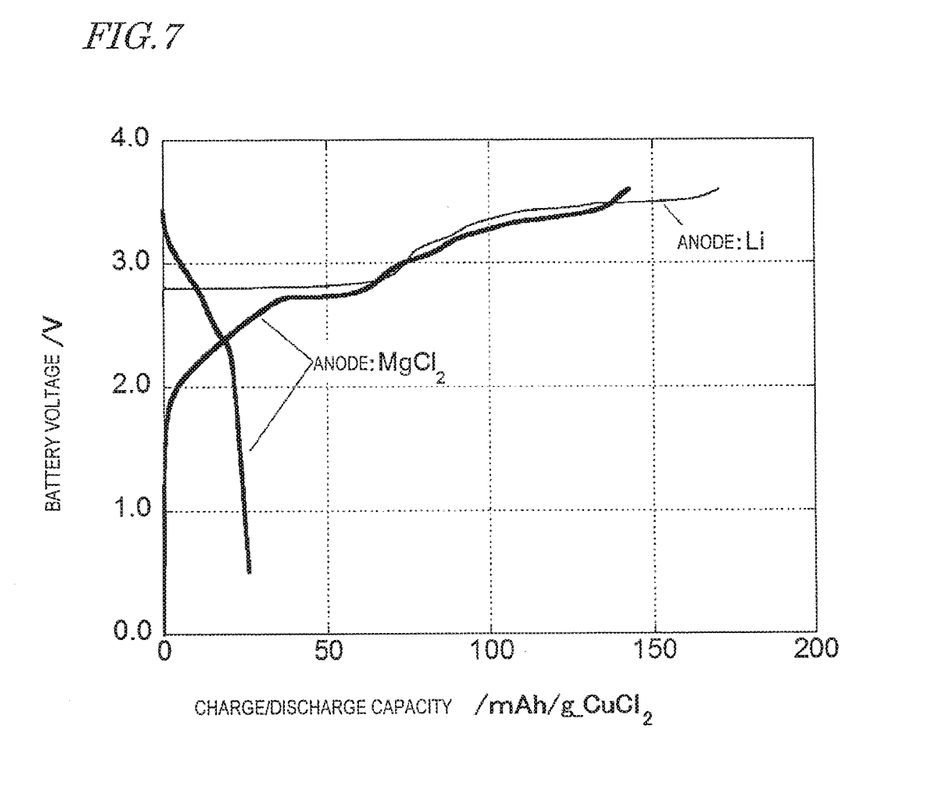
FIG. 7 shows charge and discharge curves of a non-aqueous electrolytic solution rechargeable battery in which the positive electrode included nanopowder of copper and lithium chloride; specifically a charge curve which occurred when lithium metal was used as the negative electrode and charge and discharge curves which occurred when magnesium chloride was used as the negative electrode.

FIG. 7 is a plot of charge and discharge curves obtained in that case. It can be seen that, in the first battery in which a lithium metal was used as the negative electrode, the charge curve has flat portions at about 2.8 V and 3.4 V, and these portions correspond to production of cuprous chloride and cupric chloride, respectively. In the second battery, there is a slope of voltage increase approximately from 2 V to 2.7 V, and subsequently, there are flat portions at 2.7 V and 3.3 V. This is because, in the charging process, $MgCl_2$ was reduced to Mg, and then, produced Mg reacted with lithium supplied from the positive electrode to form an alloy.

It can be seen from FIG. 7 that, after being charged, the second battery can be discharged. Since Mg and X-ray diffraction peaks corresponding to Mg and lithium can be detected after the battery was discharged, it is estimated that a small discharge capacity is attributed to decrease in utilization rate of the negative electrode.

Example 8

The present inventors assembled a battery in which silver chloride (AgCl) was used as the positive electrode active material and lithium metal was used as the negative electrode active material, and verified that charging and discharging of this battery are possible.

The positive electrode of silver chloride was formed as follows. Two sheets of silver foil (manufactured by The Nilaco Corporation; 0.1 mm thick) were immersed in a sodium chloride (NaCl) aqueous solution at the concentration of 1 M so as to oppose each other. A negative electrode current whose current density was 0.58 mA/cm² was supplied to flow through one of the silver foil sheets for one hour, whereby silver chloride was produced. A disk with a diameter of 14.8 mm was punched out from the resultant sheet, and used as the positive electrode.

The negative electrode used was lithium foil with a diameter of 15.8 mm.

The non-aqueous electrolytic solution was prepared by mixing together lithium bis(trifluoromethane sulfonyl)imide (abbreviated as LiTFSI) and tetrahydrofuran (abbreviated as THF) in a molar ratio of LiTFSI/THF=4/5 and adding PEGDME whose molecular weight was about 500 in a proportion of 8 wt %.

The thus-prepared positive electrode, negative electrode, and non-aqueous electrolytic solution were assembled, together with a polyolefin separator, in a mock battery case. The resultant mock battery was charged and discharged at the rate of 100-hour rate relative to the positive electrode capacity.

Figure 8:
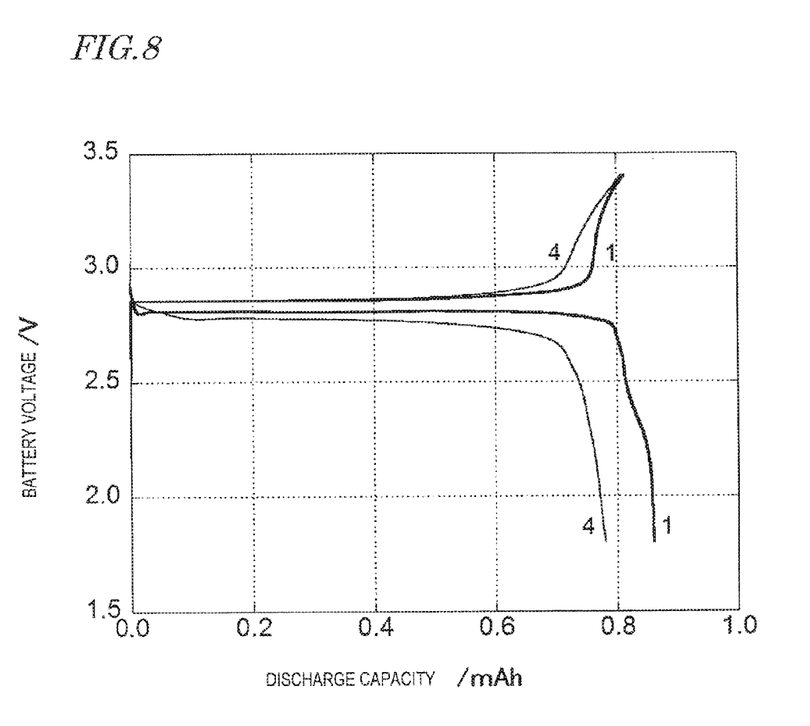
FIG. 8 shows charge and discharge curves of the first and fourth cycles in a non-aqueous electrolytic solution rechargeable battery in which silver chloride was used as the positive electrode active material.

FIG. 8 is a plot of charge and discharge curves of the first and fourth cycles obtained in that case. The theoretical voltage of the battery can be calculated by the formula shown below. It can be seen that it closely accords with the charge and discharge curves of FIG. 8.

2.845 V: AgCl+Li ⇔ Ag+LiCl     (22)

Although in Examples 1 to 8 LiTFSI was used for the lithium imide, basically the same effects can also be achieved when a lithium imide represented by $Li(XSO_2NSO_2Y)$ (where X and Y are any of F, $C_nF_{2n+1}$ and $(CF_2)_m$, and $(CF_2)_m$ forms a cyclic imide anion) is used.

The electrochemical energy storage device disclosed in the present application is useful as a power supply for smartphones, cell phones, portable information devices, personal computers, video cameras, handheld game consoles, etc. Also, the electrochemical energy storage device disclosed in the present application can be used as a power supply for driving electric tools, cleaners, robots, etc., or as a power supply for driving or supporting an electric motor of hybrid electric cars, plug-in hybrid electric cars, fuel cell powered cars, etc.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2015-64915 filed on Mar. 26, 2015, the entire contents of which are hereby incorporated by reference.

What is claimed is:

1. An electrochemical energy storage device, comprising:
a positive electrode including a positive electrode active material;
a negative electrode including a negative electrode active material; and
a non-aqueous electrolytic solution including an electrolyte salt represented by $Li(XSO_2NSO_2Y)$ (where X and Y are any of F, $C_nF_{2n+1}$ and $(CF_2)_m$, and $(CF_2)_m$ forms a cyclic imide anion), an organic solvent which is capable of dissolving the electrolyte salt, and a polyethylene glycol of which both terminals are not OH, the non-aqueous electrolytic solution being in contact with the positive electrode and the negative electrode,
wherein the positive electrode active material includes a chloride of Cu, Bi or Ag, and the negative electrode active material includes lithium, and
the non-aqueous electrolytic solution is a single-phase solution when it is at a normal temperature and includes the electrolyte salt in a proportion exceeding a solubility of the electrolyte salt in the organic solvent.

2. The electrochemical energy storage device of claim 1, wherein the organic solvent is tetrahydrofuran.

3. The electrochemical energy storage device of claim 1, wherein the organic solvent is propylene carbonate.

4. The electrochemical energy storage device of claim 1, wherein the positive electrode active material includes $CuCl_2$, CuCl, $BiCl_3$, or AgCl.

5. The electrochemical energy storage device of claim 1, wherein the positive electrode includes LiCl when the electrochemical energy storage device is in a charged state.

6. The electrochemical energy storage device of claim 1, wherein the negative electrode active material is a lithium metal.

7. The electrochemical energy storage device of claim 1, wherein the negative electrode active material is a mixture of a magnesium metal and lithium chloride or an alloy of lithium and magnesium.

8. The electrochemical energy storage device of claim 7, wherein the magnesium metal and the alloy of lithium and magnesium are produced by charging of a battery in which a magnesium compound is used in a negative electrode.

9. The electrochemical energy storage device of claim 8, wherein the magnesium compound is magnesium chloride.

* * * * *